April 11, 1961 T. A. HERBERT, JR 2,978,806
APPARATUS AND METHOD FOR MAKING SANDWICH PANELS
Filed April 18, 1955 3 Sheets-Sheet 1

T.A. HERBERT, JR.
INVENTOR.

BY George Stell
AGENT.

April 11, 1961     T. A. HERBERT, JR     2,978,806
APPARATUS AND METHOD FOR MAKING SANDWICH PANELS
Filed April 18, 1955     3 Sheets-Sheet 2

INVENTOR.
T.A. HERBERT, JR.
BY George Stell
AGENT.

April 11, 1961 T. A. HERBERT, JR 2,978,806
APPARATUS AND METHOD FOR MAKING SANDWICH PANELS
Filed April 18, 1955 3 Sheets-Sheet 3

T.A. HERBERT, JR.
INVENTOR.

BY George Stell
AGENT.

United States Patent Office 2,978,806
Patented Apr. 11, 1961

2,978,806

APPARATUS AND METHOD FOR MAKING SANDWICH PANELS

Thomas A. Herbert, Jr., Chula Vista, Calif., assignor to Rohr Aircraft Corporation, Chula Vista, Calif., a corporation of California Filed Apr. 18, 1955, Ser. No. 501,820

15 Claims. (Cl. 29—471.1)

This invention relates to a method and apparatus for making a sandwich structural panel in which the edges of a cellular core are secured to the opposing faces of two skin sheets and is particularly directed to a method and apparatus for constructing a metallic saindwich panel by brazing the edges of a metallic honeycomb core to the opposing faces of two metallic skins.

It is a primary object of the invention to provide a method and apparatus for making a light weight metallic sandwich panel in which the edges of each of the honeycomb cell walls are securely attached to the faces of the skins by a brazing operation.

A further object is to provide a method and apparatus for making a metallic sandwich panel having either flat surfaces or surfaces curved to a desired contour.

Another object is to provide a method and apparatus for making a sandwich panel having outer surfaces which are smooth and undistorted.

A further object is to provide a method and apparatus for making a metallic sandwich panel in which the brazing operation is performed in an inert atmosphere.

These and other objects and advantages will become apparent as the description of the invention proceeds.

For a better understanding of the invention reference is made to the accompanying drawing illustrating a preferred embodiment of the apparatus and the method of practising the invention and in which.

Figure 1:
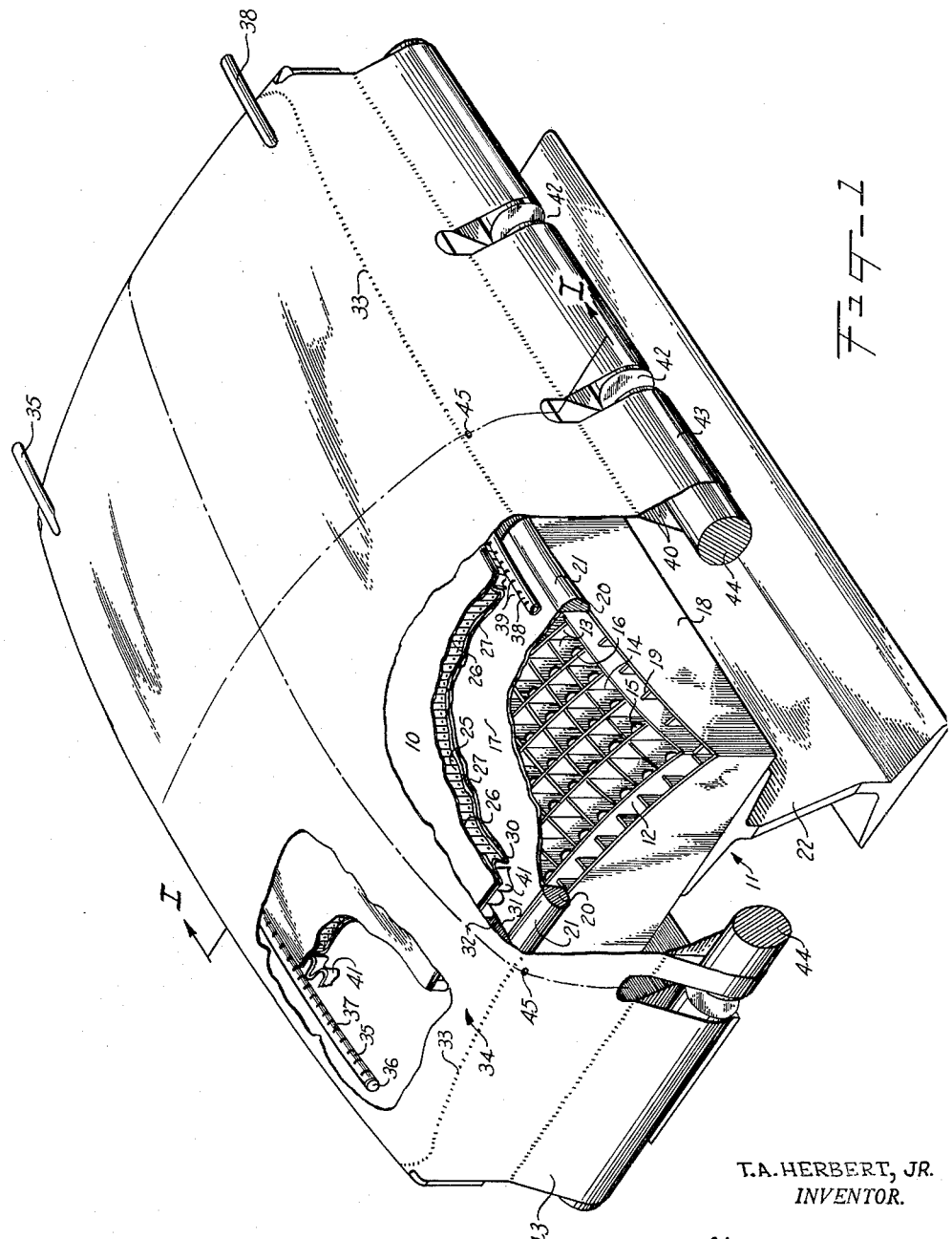
Fig. 1 is a perspective view of a supporting fixture on which a sandwich panel having curved surfaces is supported with sections of both panel and fixture cut away to show details of their construction.

With reference to Fig. 1 of the drawing, a sandwich panel 10 having a compound curved surface is shown supported on a fixture 11 preparatory to performance of the brazing operation. Fixture 11 comprises a rigid metal lattice 12 composed of flat metal bars 13 intersecting each other at substantially right angles to form a series of cells 14. The walls of each of cells 14 are provided with openings 15 passing therethrough which permit air to circulate freely throughout lattice 12. The upper surface 16 of lattice 12 is machined to the contour of the panel to be supported thereon and is covered by a metal sheet 17 which is formed to the contour of surface 16 to provide lattice 12 with a smooth unbroken supporting surface. A rigid frame 18 completely surrounds lattice 12 and is rigidly connected thereto by means of connecting ribs 19. A metal molding 20 having a smooth rounded face 21 blending with sheet 17 and extending out beyond frame 18 surrounds lattice 12 and is supported by frame 18. Lattice 12 is supported on I beams 22 the upper surfaces 23 of which are provided with openings 24 communicating with cells 14.

Figure 4:
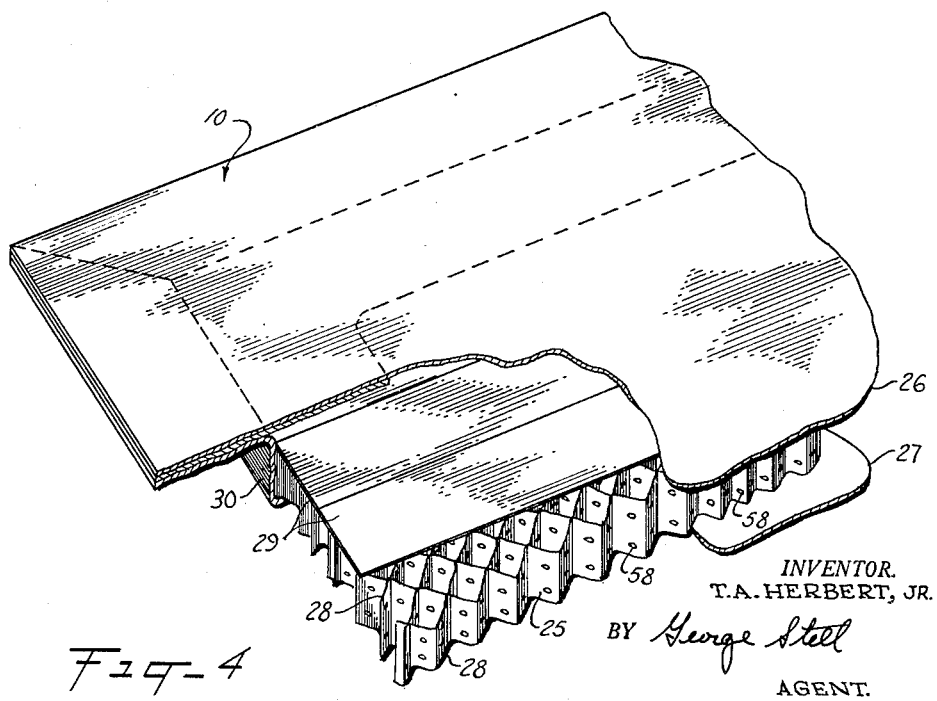
Fig. 4 is an enlarged fragmentary view of a sandwich panel showing details of the honeycomb core and, Fig. 5 is a schematic drawing of the entire apparatus used in practising the invention.

Panel 10 comprises a metallic honeycomb core 25 positioned between an upper skin sheet 26 and a lower skin sheet 27 with the walls of the honeycomb cells disposed tranversely to the surfaces of skins 26 and 27. The panel is prepared for assembly by covering the edges 28 of core 25 with a thin layer of brazing alloy preferably consisting of strips of brazing alloy foil 29 (see Fig. 4) laid edge to edge. Foil 29 may vary in thickness according to the amount of brazing material deposit desired and the type of alloy used. It has been found that a brazing alloy consisting of 85% silver and 15% manganese in a foil approximately .002 inch thick provides a sufficient deposit of brazing material to securely attach the edges of a honeycomb core formed of stainless steel approximately .010 inch thick, to the faces of stainless steel skins by heating the skins and core to a temperature of approximately 1800 F. If the panel is made of material other than stainless steel a brazing alloy is used which will furnish a bond of suitable strength and which has a melting point well below the melting point of the skins and core. Core 25, its edges 28 covered with strips 29 of brazing alloy, is placed between skins 26 and 27 in assembled relationship therewith, skins 26 and 27 having been formed to the desired contour, and a closure member 30 is placed around the sides of the core. Member 30 may be one of various shapes in cross section such as a C shape or Z shape as shown in the drawing and is for the purpose of providing the panel with an edge adapted to receive the fasteners (not shown) used in securing the panel to a structure. The surfaces of member 30 in contact with skins 26 and 27 and core 25 are also covered with strips 29 of brazing alloy. Panel 10 in assembled relationship is positioned between two sheets 31 and 32 of flexible sheet metal both of which are of substantially greater size than skins 26 and 27. Sheets 31 and 32 are secured together as by resistance seam welding along a line extending entirely around panel 10 as shown at 33 (Fig. 1), thus forming a sealed envelope 34 containing panel 10. Envelope 34 is provided with an outlet tube 35 passing through sheet 31 and extending along one side of panel 10 within the envelope. The inner end 36 of tube 35 is closed and the portion of the tube within envelope 34 is provided with spaced apart slots 37 passing through the wall thereof. Envelope 34 is provided with an inlet tube 38 which passes through sheet 31 and extends along the opposite side of panel 10 within the envelope. The portion of tube 38 within envelope 34 is provided with spaced apart openings 39 which are of such size that their combined area is approximately equal to the cross sectional area of tube 38 and the inner end of tube 38 (not shown) is closed in the same manner as end of tube 35. The extending edges 40 of sheets 31 and 32 are secured together and portions cut away as shown at 42 to form slings 43 adapted to receive weights 44. To hold the various parts of panel 10 in assembled relationship with each other while the panel is being enclosed in envelope 34, the parts are spot soldered together in their assembled positions.

Figure 2:
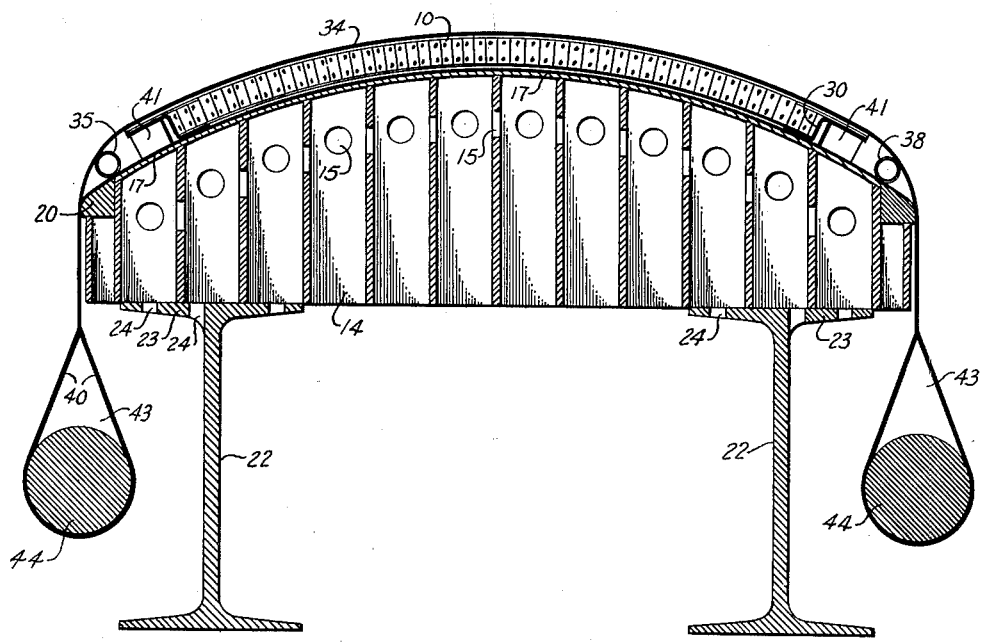
Fig. 2 is a cross sectional view of Fig. 1 taken on line 1—1.

Envelope 34 containing panel 10 is placed on fixture 11 as shown with the center of panel 10 in approximate alignment with the center of lattice 12. To facilitate positioning envelope 34 and panel 10 on fixture 11 sheets 31 and 32 are provided with small openings 45 passing therethrough outwardly of seam 33 which are aligned with suitable markings (not shown) on fixture 11. Weights 44 are placed in slings 43 and permitted to hang down along the sides of fixture 11 to apply tension to the edges of envelope 34 causing sheet 31 to conform to the contour of the top of lattice 12 and sheet 32 to force sheets 26 and 27 towards core 25. To prevent damage to the edges of panel 10 from the force with which they are pressed against fixture 11, a rigid supporting member 41 in the form of an undulate strip of metal is placed under the upper portion of edge member 30 as shown in Figs. 1 and 2 of the drawing to support the edges of the panel.

In the above description of fixture 11 the upper surface 16 of lattice 12 is machined to a contour adapted to support panel 10 which is illustrated as having two curved skins 26 and 27 between which is positioned a honeycomb core 25 of uniform thickness. It is to be understood that fixture 11 may be used to equal advantage in supporting a panel comprising one flat skin and one curved skin between which is placed a honeycomb core having one flat edge and one edge curved to conform to the shape of the curved skin. In this instance upper surface 16 of lattice 12 is machined to a plane surface to provide a plane supporting surface for flat sheet 17 and envelope 34.

Figure 5:
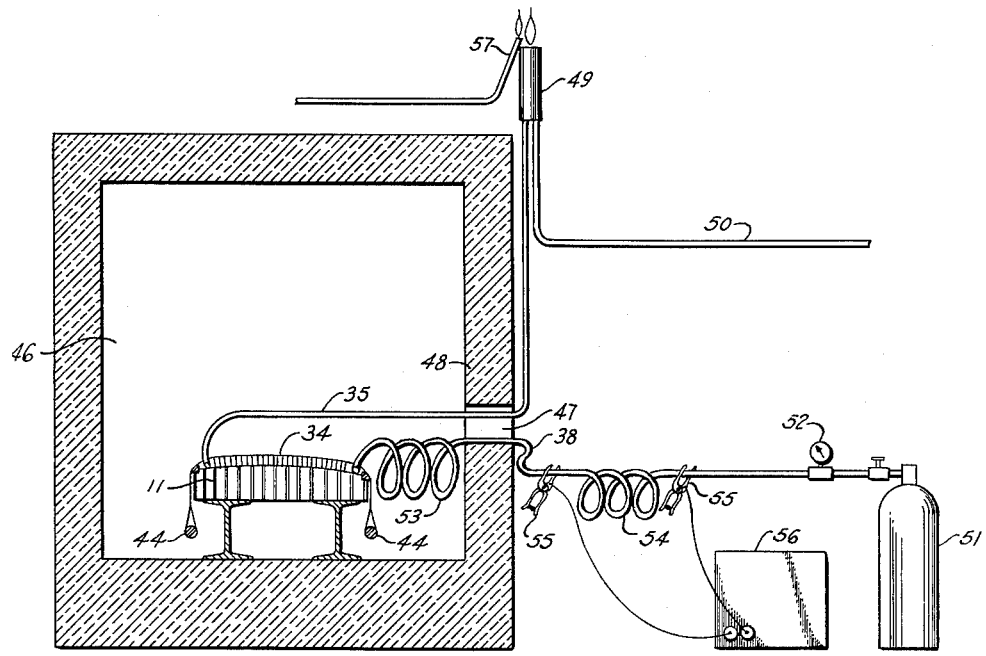

With reference to Fig. 5 of the drawing, fixture 11 supporting envelope 34 and panel 10 is placed within a furnace 46 with tubes 35 and 38 extending out through an opening 47 in the wall 48 thereof. Outlet tube 35 is attached to an aspirator 49 of a known type operated by compressed air supplied from a source (not shown) through an air line 50, for the purpose of withdrawing air from within envelope 34. Inlet tube 38 is connected to a source 51 of dry hydrogen or other inert gas and is provided with a regulator 52 to control the amount of gas entering envelope 34 therethrough. A section of tube 38 within furnace 46 is formed in a spiral coil 53 and a section immediately outside of furnace 46 is formed in a spiral coil 54 to provide means for heating the hydrogen gas as it passes through tube 38. Coil 54 is heated by its resistance to an electrical current passing therethrough between connections 55 attached to tube 38 at each end of coil 54 and which are connected with the secondary winding of an electrical transformer 56. The amount of electrical current flowing between connections 55 may be easily controlled by adjustment of transformer 56 so that the temperature of coil 54 is regulated to heat the gas passing therethrough to a desired temperature. Coil 53 within furnace 46 is heated by the furnace atmosphere so that the temperature of the gas is further increased in passing therethrough before entering envelope 34.

To perform the brazing operation air is withdrawn from within envelope 34 through outlet tube 35 by means of aspirator 49 to lower the pressure within envelope 34 a substantial amount below the pressure of the ambient furnace atmosphere. The decreased pressure within envelope 34 causes the pressure of the ambient atmosphere to press sheets 31 and 32 inwardly against skins 26 and 27 forcing the skins into firm smooth contact with the brazing alloy strips and pressing the latter against the edges of core 25. Hydrogen gas from source 51 is permitted to flow through tube 38 into envelope 34 the rate of flow being controlled by regulator 52 so that the pressure within envelope 34 remains below the pressure of the surrounding furnace atmosphere. The air withdrawn from within envelope 34 enters tube 35 through slots 37 along the entire length of one side of panel 10 and the hydrogen gas admitted into envelope 34 leaves tube 38 through openings 34 along the entire length of the opposite side of the panel so that the withdrawal of the air from envelope 34 and its replacement with hydrogen gas takes place quickly and evenly. To prevent the pressure within envelope 34 from rising during the brazing operation aspirator 49 remains in operation to continually withdraw a small amount of hydrogen from within envelope 34, the gas being ignited by a pilot flame 57 as it is exhausted from aspirator 49, to render it harmless. To facilitate withdrawal of air from within envelope 34 and permit the hydrogen gas to flow evenly and quickly into all parts of panel 10 honeycomb core 25 is preferably of the type provided with vents 58 (see Fig. 4) extending through the cell walls.

Furnace 46 is heated to a brazing temperature and electrical current is passed through coil 54 to heat the hydrogen gas passing therethrough in the manner previously explained. The hot furnace atmosphere circulates freely through lattice 12 passing through openings 15 in the walls of cells 14 to quickly and uniformly heat panel 10 and the hydrogen gas entering envelope 34 being preheated as it passes through coils 53 and 54 permits panel 10 to reach a brazing temperature very quickly. When panel 10 has been heated sufficiently to cause the brazing alloy to melt and flow along edges 28 of core 25, transformer 56 is disconnected and the flow of hydrogen gas through tube 38 is stopped. Tubes 35 and 38 are disconnected from aspirator 49 and hydrogen supply 51 respectively and fixture 11 is removed from the furnace. Envelope 34 and panel 10 are allowed to cool and the panel removed from within the envelope. The brazing operation having taken place in an inert atmosphere provided by the hydrogen gas, the core and skins of the completed panel will be entirely free from scale or other undesirable effects which would be caused by the presence of oxygen during the brazing operation.

Figure 3:
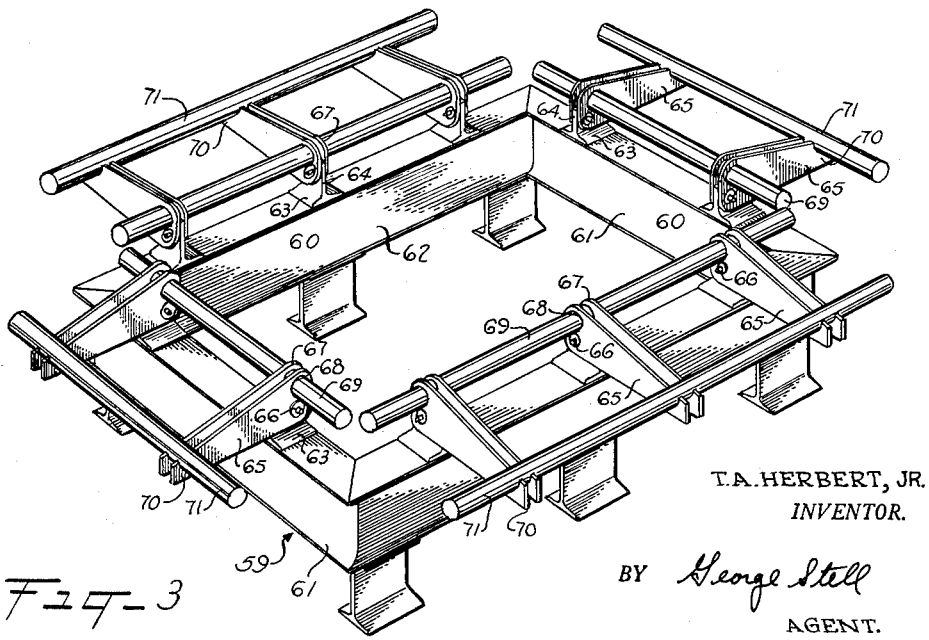
Fig. 3 is a view of a modified supporting fixture used in the construction of sandwich panels having two flat surfaces.

The above description relates to the production of a sandwich panel having at least one curved surface and includes a fixture 11 adapted to support such a panel. To produce a sandwich panel having plane surfaces a modification of fixture 11 is used to support envelope 34 containing the assembled panel. With reference to Fig. 3 of the drawing, a fixture 59 is shown which is a preferred modification of fixture 11 and which is adapted to support an envelope 34 containing a panel having plane surfaces. Fixture 59 comprises a rigid frame 60 having ends 61 and sides 62 on which are secured a series of mounting plates 63 having vertical center portions 64. A tensioning arm 65 is pivotally attached to each of center portions 64 by means of a pivot pin 66 passing through arm 65 near its inner end 67 and through portion 64. Arms 65 are provided with aligned openings 68 passing therethrough near ends 67 and above pins 66 which are adapted to pass a bar 69. The outer ends 70 of arms 65 are adapted to receive a heavy weight such as a bar 71 as shown in the drawing for a purpose to be explained.

To use fixture 59 in the construction of a sandwich panel of the type described having plane surfaces, the panel is prepared for brazing and placed in envelope 34 in the same manner as previously described. Weights 71 are removed from outer ends 70 of arms 65 and bars 69 are withdrawn from openings 68, slings 43 of envelope 34 are positioned between arms 65 in alignment with openings 68 and bars 69 are replaced in openings 68 passing through slings 43 to suspend envelope 34 over frame 60. Weights 71 are placed on ends 70 of arms 65 pressing ends 70 downward causing arms 65 to pivot on pins 66. The pivotal movement of arms 65 causes bars 69 to move outwardly away from frame 60 thereby applying sufficient tension to the edges of envelope 34 to rigidly suspend the envelope in a horizontal plane over frame 60. The amount of tension required to rigidly suspend envelope 34 varies with the size of the envelope and the size and weight of the panel contained therein and the amount of tension applied may be increased or decreased by increasing or decreasing the amount of weight applied to ends 70 of arms 65. Fixture 59 supporting envelope 34 in the above described manner is placed in furnace 46 and the procedure previously described is followed to carry out the brazing operation.

This invention may be embodied in other forms or carried out in other ways without departing from the spirit or essential characteristics thereof. The present embodiment of the invention is therefore to be considered as in all respects illustrative and not restrictive, the scope of the invention being indicated by the appended claims, and all changes which come within the meaning and range of equivalency of the claims are intended to be embraced therein.

Having thus described my invention, what I claim as new and useful and desire to secure by Letters Patent is:

1. The method of making a sandwich panel wherein the edges of a metallic cellular core are secured to the opposing faces of two spaced apart metallic skins at least one of which is curved comprising the steps of covering the edges of said core with thin sheets of brazing alloy; placing said core between said skins in assembled relationship therewith; enclosing said assembled skins and core within a sealed flexible metallic envelope having lateral dimensions substantially greater than those of said assembled skins and core; placing said envelope containing said assembled skins and core on the upper surface of a rigid support with the other one of said skins adjacent said surface, said surface conforming to the surface of said other one of the skins and terminating in a rigid peripheral edge having lateral dimensions greater than said skins and less than said envelope; withdrawing air from within said envelope to reduce the pressure therein a substantial amount below the pressure of the ambient atmosphere; admitting an inert gas into said envelope; applying tension to the edges of said envelope and tensioning the same over said peripheral edge in a downwardly direction to tension the layers of said envelope to thereby press said skins and core into intimate contact with said sheets of alloy; heating said skins and core to a brazing temperature; cooling said skins and core; and removing the brazed panel from within the envelope.

2. The method claimed in claim 1 which includes the additional step of regulating the admission of the inert gas into said envelope to an amount which causes the pressure within said envelope to remain below the pressure of the ambient atmosphere.

3. The method claimed in claim 1 which includes the additional step of heating the inert gas prior to admitting the gas into said envelope.

4. The method of making a sandwich panel wherein the edges of a metallic cellular core are secured to the opposing faces of two spaced apart metallic skins, at least one of said skins being curved, comprising the steps of covering the edges of said core with strips of brazing alloy foil; placing said core between said skins in assembled relationship therewith; enclosing said skins and core within a sealed envelope of flexible sheet metal having lateral dimensions greater than those of said skins and core; withdrawing air from within said envelope to reduce the pressure therein a substantial amount below the pressure of the ambient atmosphere; admitting an inert gas into said envelope; placing said envelope on a rigid support having an upper supporting surface terminating in a rigid peripheral edge and adapted to support said envelope and said assembled skins and core with the other of said skins adjacent said supporting surface and with the edges of said envelope extending beyond the edge of said upper supporting surface; applying tension to the edges of said envelope and tensioning the same over said peripheral edge in a downwardly direction to tension the layers of said envelope and to draw said envelope against said supporting surface; heating said skins and core to a brazing temperature; cooling said skins and core; and removing the brazed panel from within said envelope.

5. The method of making a sandwich panel wherein the edges of a metallic cellular core are secured to the opposing faces of two spaced apart curved metallic skins comprising the steps of covering the edges of said core with thin sheets of brazing alloy; placing said core between said skins in assembled relationship therewith; enclosing said skins and core within a sealed envelope of flexible sheet metal having lateral dimensions substantially greater than those of said assembled skins and core; withdrawing air from within said envelope to reduce pressure therein a substantial amount below the pressure of the ambient atmosphere; admitting an inert gas into said envelope; placing said envelope containing said skins and core on a rigid support having an upper supporting surface terminating in a rigid peripheral edge and shaped in conformance with the curvature of one of said skins and having lateral dimensions smaller than those of said envelope; applying tension to the edges of said envelope and tensioning the same over said peripheral edge in a downwardly direction to tension the layers of said envelope; heating said skins and core to a brazing temperature; cooling said skins and core; and removing the completed panel from within said envelope.

6. The method claimed in claim 5 which includes the additional step of placing a rigid support around the side of said core between the edges of said skins to hold said edges in spaced apart positions.

7. In the construction of a sandwich panel wherein the edges of a metallic cellular core are brazed to the opposing faces of two spaced apart metallic skins at least one of which is curved, means for holding said skins and core in assembled relationship during the brazing operation, comprising: a rigid support having an upper supporting surface arranged and constructed to support said panel in assembled position with the other of said skins adjacent said supporting surface, said surface conforming to the surface of said other of the skins and terminating in a rigid peripheral edge having lateral dimensions greater than said skins; a flexible metallic envelope having spaced layers adapted to contain said assembled panel therebetween, said envelope having lateral dimensions greater than those of said upper supporting surface; and tensioning means connected to the extending edges of said envelope and directed to tension the envelope over said peripheral edge and downwardly thereof whereby said layers are drawn toward each other against the assembled panel to press said skins and core into firm contact with each other and said envelope and panel are drawn into conformity with said support surface.

8. In the construction of a sandwich panel wherein the edges of a metallic cellular core are brazed to the opposing faces of two spaced apart metallic skins at least one of which is curved, means for holding said skins and core in assembled relationship during the brazing operation, comprising: a rigid support having an upper surface arranged to support said panel in assembled position with the other of said skins adjacent said support surface, said surface conforming to the surface of said other of the skins and terminating in a rigid peripheral edge having lateral dimensions greater than said skins; a sealed envelope of flexible sheet metal adapted to contain said panel in assembled position, said envelope being provided with inlet and outlet tubes communicating with the interior thereof and having lateral dimensions greater than those of said upper surface; and tensioning means connected to the extending edges of said envelope and directed to tension the envelope over said peripheral edge and downwardly thereof thereby to tension the layers of said envelope whereby the same are drawn toward each other against the assembled panel to press said skins and core into firm contact with each other and said envelope and panel are drawn into conformity with said support surface.

9. Means for holding a sandwich panel as claimed in claim 8; in which said envelope comprises two substantially rectangular sheets of flexible sheet metal having lateral dimensions substantially greater than those of the upper surface of said rigid support, said sheets being hermetically connected together along a continuous line immediately surrounding said panel.

10. In the construction of a sandwich panel wherein the edges of a metallic cellular core are brazed to the opposing faces of two spaced apart curved metallic skins, means for holding said skins and core in assembled relationship during the brazing operation, comprising: a rigid support having a curved upper surface arranged to support said panel in assembled position with the surface of the skin adjacent said upper surface conforming to the curvature thereof, said upper surface terminating in a rigid peripheral edge having lateral dimensions greater than those of said skins; a flexible sheet metal envelope adapted to contain said panel, said envelope being provided with inlet and outlet tubes communicating with the interior thereof and having lateral dimensions substantially greater than those of said upper surface; and tensioning means connected to the extending edges of said envelope and directed to tension the envelope over said peripheral edge and downwardly thereof thereby to tension the layers of said envelope whereby the same are drawn toward each other against the assembled panel to press said skins and core into firm contact with each other and said envelope and panel are drawn into conformity with said support surface.

11. Means for holding a sandwich panel as claimed in claim 10; in which said rigid support comprises a plurality of rigid metallic bars intersecting to form a metallic lattice, said bars having their upper surfaces shaped to form a supporting surface of desired shape.

12. Means for holding a sandwich panel as claimed in claim 10; in which said tensioning means comprises a plurality of weights uniformly distributed along and connected to the extending edges of said envelope, said weights being positioned along the sides of said rigid support below the upper surface of said rigid support.

13. In the construction of a sandwich panel wherein the edges of a metallic cellular core are brazed to the opposing faces of two spaced apart curved metallic skins, means for holding said skins and core in assembled relationship during the brazing operation, comprising: a rigid support having vertical sidewalls and an extended convexly curved surface extending above the tops of said sidewalls; a rectangular envelope constructed from sheet metal and having lateral dimensions substantially greater than those of said curved support surface, the layers of said envelope being welded together along continuous lines to form a hermetically sealed chamber of substantially the dimensions of said curved support surface, said core and skins being positioned within said chamber with the chamber substantially centered with respect to said support surface and with said envelope supported thereon, the one of said skins adjacent said support surface conforming to the curvature thereof; inlet and outlet connections extending to and from said sealed chamber; and weights uniformly distributed along and connected to the outer edges of said envelope, said weights extending along the sides of said support and below said curved support surface to tension said layers of the envelope whereby the same are drawn toward each other against the assembled panel to press said skins and core into firm contact with each other and said envelope and panel are drawn into conformity with said support surface.

14. The method of making a sandwich panel wherein the edges of a metallic cellular core are secured to the opposing faces of two spaced apart metallic skins at least one of which is curved comprising the steps of covering the edges of said core with thin sheets of brazing alloy; placing said core between said skins in assembled relationship therewith; enclosing said assembled skins and core within a sealed flexible metallic envelope having lateral dimensions substantially greater than those of said assembled skins and core; placing said envelope containing said assembled skins and core on the upper surface of a rigid support with the other one of said skins adjacent said surface, said surface conforming to the surface of said other one of the skins and terminating in a rigid peripheral edge having lateral dimensions greater than said skins and less than said envelope; applying tension to the edges of said envelope and tensioning the same over said peripheral edge in a downwardly direction to tension the layers of said envelope to thereby press said skins and core into intimate contact with said sheets of alloy; heating said skins and core to a brazing temperature; cooling said skins and core; and removing the brazed panel from within the envelope.

15. The method of making a sandwich panel wherein the edges of a metallic cellular core are secured to the opposing faces of two spaced apart metallic skins at least one of which is curved comprising the steps of covering the edges of said core with thin sheets of brazing alloy; placing said core between said skins in assembled relationship therewith; enclosing said assembled skins and core within a sealed flexible metallic envelope having lateral dimensions substantially greater than those of said assembled skins and core; placing said envelope containing said assembled skins and core on the upper surface of a rigid support with the other one of said skins adjacent said surface, said surface conforming to the surface of said other one of the skins and terminating in a rigid peripheral edge having lateral dimensions greater than said skins and less than said envelope; withdrawing air from within said envelope to reduce the pressure therein a substantial amount below the pressure of the ambient atmosphere; applying tension to the edges of said envelope and tensioning the same over said peripheral edge in a downwardly direction to tension the layers of said envelope to thereby press said skins and core into intimate contact with said sheets of alloy; heating said skins and core to a brazing temperature; cooling said skins and core; and removing the brazed panel from within the envelope.

References Cited in the file of this patent
UNITED STATES PATENTS

| | | |
|---|---|---|
| 1,247,250 | Field | Nov. 20, 1917 |
| 1,608,735 | Haas et al. | Nov. 30, 1926 |
| 2,093,814 | Mann | Sept. 21, 1937 |
| 2,276,004 | Vidal et al. | Mar. 10, 1942 |
| 2,337,250 | Klassen | Dec. 21, 1943 |
| 2,451,360 | Skehan | Oct. 12, 1948 |
| 2,451,783 | Sweeney | Oct. 19, 1948 |
| 2,634,697 | Nofzinger | Apr. 14, 1953 |
| 2,636,539 | Pajak | Apr. 28, 1953 |
| 2,654,822 | Agule | Oct. 6, 1953 |
| 2,700,632 | Ackerlund | Jan. 25, 1955 |
| 2,713,196 | Brown | July 19, 1955 |
| 2,722,735 | Beamish | Nov. 8, 1955 |
| 2,737,917 | Steele | Mar. 13, 1956 |
| 2,782,458 | Emmert et al. | Feb. 26, 1957 |
| 2,845,698 | Giovannucci et al. | Aug. 5, 1958 |